(12) United States Patent
Deng

(10) Patent No.: US 12,346,011 B2
(45) Date of Patent: Jul. 1, 2025

(54) PHOTOGRAPHIC SUPPORT WITH RAPID HEIGHT ADJUSTMENT MECHANISM

(71) Applicant: Guangdong Laitu Imaging Technology Co., Ltd., Zhongshan (CN)

(72) Inventor: Tongling Deng, Zhongshan (CN)

(73) Assignee: Guangdong Laitu Imaging Technology Co., Ltd., Zhongshan (CN)

( * ) Notice: Subject to any disclaimer, the term of this patent is extended or adjusted under 35 U.S.C. 154(b) by 154 days.

(21) Appl. No.: 18/462,281

(22) Filed: Sep. 6, 2023

(65) Prior Publication Data

US 2025/0060655 A1    Feb. 20, 2025

(51) Int. Cl.
*G03B 17/56* (2021.01)
*F16M 11/24* (2006.01)
*F16M 11/34* (2006.01)

(52) U.S. Cl.
CPC ......... *G03B 17/561* (2013.01); *F16M 11/245* (2013.01); *F16M 11/34* (2013.01)

(58) Field of Classification Search
None
See application file for complete search history.

(56) References Cited

U.S. PATENT DOCUMENTS

2024/0309989 A1* 9/2024 Zou ..................... G03B 17/561

FOREIGN PATENT DOCUMENTS

| CN | 102608843 A | * | 7/2012 | ........... F16M 11/041 |
| CN | 112503360 A | * | 3/2021 | ................. F16B 7/10 |
| CN | 116293329 A | * | 6/2023 | ............. F16B 7/1463 |
| CN | 116592240 A | * | 8/2023 | ........... F16M 11/046 |

OTHER PUBLICATIONS

English translation of CN-116592240-A, Guo, 2023 (Year: 2023).*
English translation of CN-116293329-A, Duan, 2023 (Year: 2023).*
English translation of CN-112503360-A, Zhou, 2023 (Year: 2023).*
English translation of CN-102608843-A, Yang, 2012 (Year: 2012).*

* cited by examiner

*Primary Examiner* — James M Hannett
(74) *Attorney, Agent, or Firm* — Wang Law Firm, Inc.

(57) ABSTRACT

A photographic support with rapid height adjustment mechanism has a leg with a connection seat on which a fixed tube is fixedly mounted, a first locking seat with a first mounting chamber is fixedly mounted on the fixed tube, and a first movable tube is slid within the fixed tube and extends through the first mounting chamber to the rear side at the rear end. A locking assembly is provided in the first mounting chamber for sleeving on the first movable tube and locked with the first locking seat, a transmission assembly is mounted on the first locking seat to drive the locking assembly to be unlocked or locked, and a driving assembly is used to drive the transmission assembly. Compared to the prior art, the support reduces the size of the product, which is advantageous for carrying and storage.

10 Claims, 10 Drawing Sheets

PHOTOGRAPHIC SUPPORT WITH RAPID HEIGHT ADJUSTMENT MECHANISM

FIELD OF INVENTION

The present invention relates to a photographic support with rapid height adjustment mechanism.

BACKGROUND OF THE INVENTION

Existing technology, such as a Chinese invention patent application document, Publication No. CN115750552A, discloses a telescopic support locking device comprising a fixed tube, a first movable tube slidably provided in the fixed tube so as to be telescopically movable relative to the fixed tube, and a first locking structure disposed between the first movable tube and the fixed tube and capable of locking or unlocking the first movable tube to the fixed tube; a second movable tube is slid on the first movable tube and is movable relative to the first movable tube; a second locking structure is provided between the second movable tube and the first movable tube and capable of locking or unlocking the second movable tube to the first movable tube; and a linkage mechanism is provided between the second locking structure and the first locking structure capable of linking the second locking structure and the first locking structure for synchronous locking or unlocking to avoid operation of the locking mechanisms at different positions and to facilitate extension and retraction of the telescopic support locking device by the user to improve convenience of use.

According to the above, in the prior art, the fixed tube, the first movable tube, and the second movable tube are arranged in parallel and abreast, but such structural arrangement makes the transverse dimension of the whole product rather large and is not favorable for carrying and storing.

Meanwhile, in the prior art, the first movable tube is secured to the fixed tube by deflecting the whole formed by a flip lock, a first shaft, and a linkage lever to tighten a first locking member against a side wall of the fixed tube when it is locked. Further moving the linkage lever upward by using a push block to act on a first drive block, and using a second drive block located at a lower end of the linkage lever to act on a second locking member to tighten it against a side wall of the first movable tube. Under this locking structure, the second movable tube and the first movable tube are fixed by pressing the locking members against the side walls of the tubes, but this one-sided pressing and locking method is prone to damage the surface of the tubes and is prone to loosening due to uneven stress or causing a dent on the tubes.

SUMMARY OF THE INVENTION

The present invention aims to solve at least one of the technical problems existing in the prior art. To this end, the present invention proposes a photographic support using a slide-in mounting structure which can reduce the width size of the product and is convenient for carrying and storing, and the slide-in locking structure can prevent wear or easy loosening due to one-sided stress.

The photographic support with rapid height adjustment mechanism designed for this purpose, comprising a leg consisting of a connection seat on which a fixed tube is fixedly mounted, a first locking seat is fixedly mounted on the rear end of the fixed tube, a first mounting chamber is provided in the first locking seat, a first movable tube which can be moved forward and backward relative to the fixed tube is slid within the fixed tube, and the rear end of the first movable tube extends through the first mounting chamber to the rear side. A locking assembly is provided in the first mounting chamber for sleeving on the first movable tube and locked with the first locking seat, a transmission assembly is mounted on the first locking seat to drive the locking assembly to be unlocked or locked, and a driving assembly is also provided on the first locking seat to drive the transmission assembly for operation.

In comparison with the prior art, the present invention uses a slide-in assembly structure to reduce the size of the product, which is convenient for carrying and storing, by means of the first movable tube which is slid within the fixed tube and can be moved back and forth relative to the fixed tube. Meanwhile, the first mounting chamber is provided with the locking assembly for sleeving on the first movable tube and locked with the first locking seat, and the use of a slide-in type locking structure prevents wear or easy loosening due to one-sided stress.

DETAILED DESCRIPTION OF THE PREFERRED EMBODIMENTS

Figure 1:
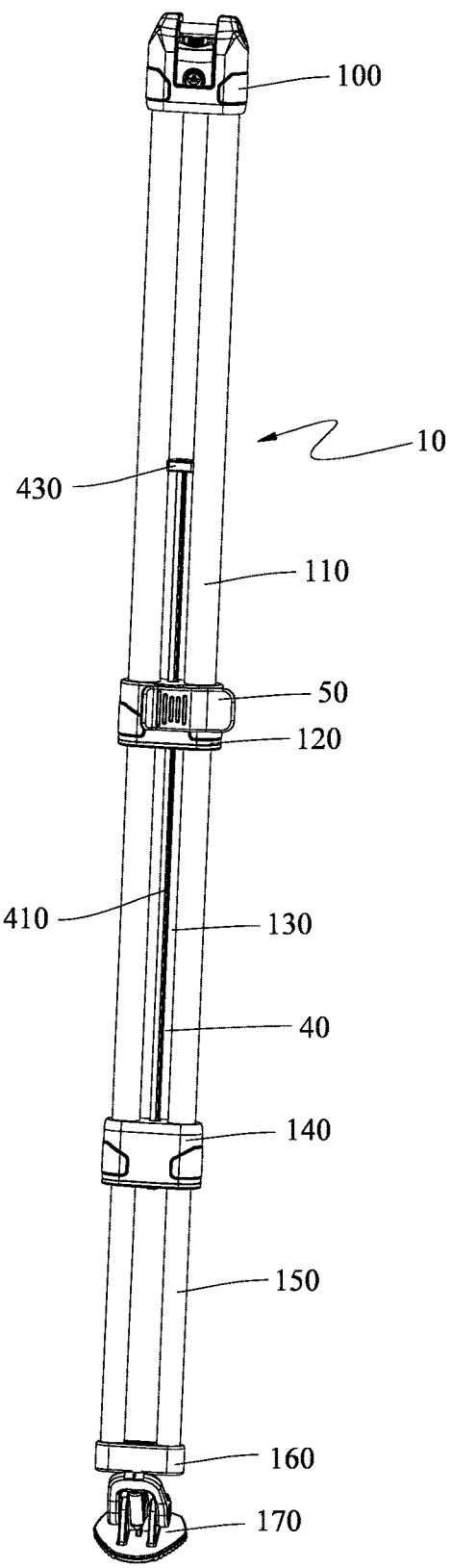
FIG. 1 is a schematic diagram of a three-dimensional leg structure of the present invention.

The present invention will be further described below in connection with the accompanying drawings and embodiments.

Referring to FIGS. 1 to 10, a photographic support with rapid height adjustment mechanism, comprising a leg 10 consisting of a connection seat 100 on which a fixed tube 110 is fixedly mounted, a first locking seat 120 is fixedly mounted on the rear end of the fixed tube 110, a first mounting chamber 125 is provided in the first locking seat 120, a first movable tube 130, which can be moved forward and backward relative to the fixed tube 110, is slid within the fixed tube 110, and a rear end of the first movable tube 130 extends through the first mounting chamber 125 to the rear side. A locking assembly 20 is provided in the first mounting chamber 125 for sleeving on the first movable tube 130 and locked with the first locking seat 120, a transmission assembly 30 is mounted on the first locking seat 120 to drive the locking assembly 20 to be unlocked or locked, and a driving assembly 50 is also provided on the first locking seat 120 to drive the transmission assembly 30 for operation.

According to the above, the structure uses a slide-in assembly structure to reduce the size of the product, which is convenient for carrying and storing, by means of the first movable tube which is slid within the fixed tube and can be moved back and forth relative to the fixed tube. Meanwhile, the first mounting chamber is provided with the locking assembly for sleeving on the first movable tube and locked with the first locking seat, and the use of a slide-in type locking structure prevents wear or easy loosening due to one-sided stress.

When the position of the first movable tube 130 relative to the fixed tube 110 needs to be adjusted, the first movable tube 130 can be pulled relative to the fixed tube 110 to adjust the forward and backward position only after the locking assembly 20 is unlocked by the driving assembly 50 driving the transmission assembly 30.

Referring to FIGS. 3 to 7, the first mounting chamber 125 comprises a connection hole 121, a conical locking hole 122, and a guided groove 123 in sequence from back to front, wherein a rear end of the fixed tube 110 is fixedly connected to the connection hole 121, and the locking assembly 20 comprises a moving member 210 which is moved forward and backward within the guided groove 123, and the moving member 210 is provided with a conical locking sleeve 220 which can be sleeved on the first movable tube 130 and inserted into the conical locking hole 122 to achieve the clamping and locking operation of the first movable tube 130. The conical locking sleeve 220 is provided with multiple deformation slots 221, and the transmission assembly 30 is used to drive the moving member 210 to move forward and backward with respect to the guided groove 123.

The fixed tube 110 is threaded into the connection hole 121.

In a locked state, the conical locking sleeve 220 is embedded in the conical locking hole 122, which enables the conical locking sleeve 220 to deform and to clamp the first movable tube 130 so as to achieve that the first movable tube 130, the conical locking sleeve 220, and the first locking seat 120 are in the locked state with each other.

In an unlocked state, the transmission assembly 30 can move the moving member 210 relative to the first locking seat 120 to disengage the conical locking sleeve 220 from the conical locking hole 122 to separate the conical locking sleeve 220 from the first movable tube 130 to achieve unlocking.

Referring to FIGS. 4 to 8, the transmission assembly 30 comprises a rotating member 310 rotatably disposed within the first mounting chamber 125, the rotating member 310 being provided with a driving helical tooth 312 at one end near the moving member 210 which is provided with a driven helical tooth 212 intermeshed with the driving helical tooth 312; the driving assembly 50 is provided for driving the moving member 210 to be rotatably disposed relative to the first mounting chamber 125 which is provided with a resilient member 230 for applying a thrust force to the moving member 210 to maintain the conical locking sleeve 220 inserted in the conical locking hole 122.

The elastic force exerted by the resilient member 230 can drive the conical locking sleeve 220 to remain within the conical locking hole 122 to achieve clamping and locking of the first movable tube 130. When unlocking is required, the driving helical tooth 312 drives the driven helical tooth 212 to drive the moving member 210 relatives to the first locking seat 120 by driving the rotating member 310 to disengage the conical locking sleeve 220 from the conical locking hole 122 so as to separate the conical locking sleeve 220 from the first movable tube 130, thereby achieving unlocking.

Figure 4:
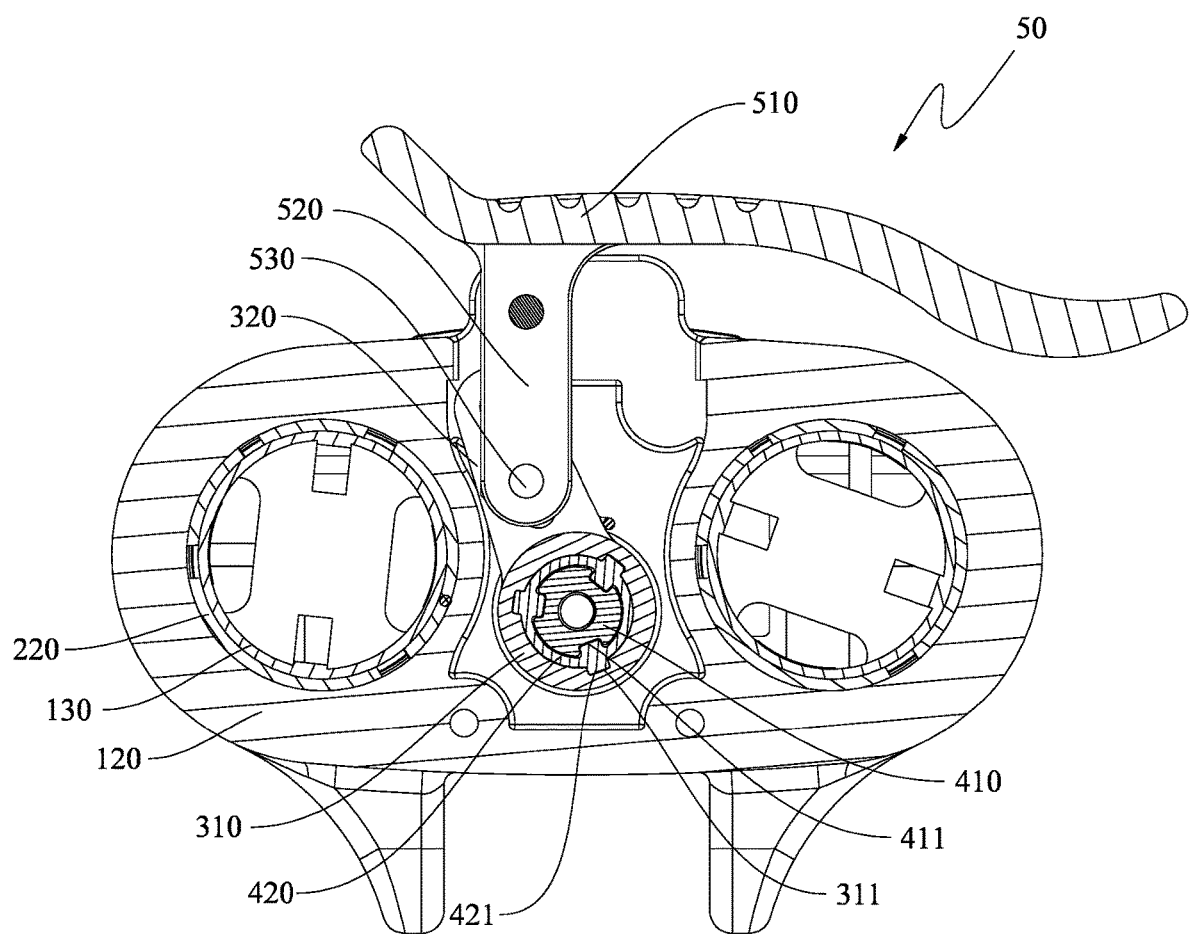
FIG. 4 is a second schematic diagram of a leg sectional structure of the present invention.
Figure 5:
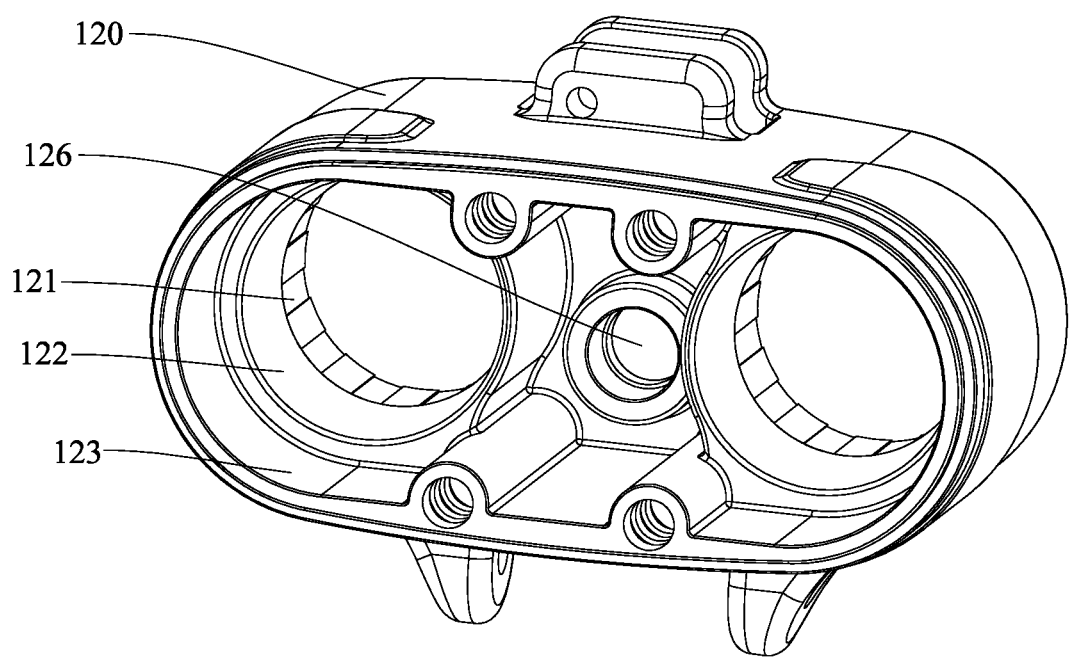
FIG. 5 is a schematic diagram of a structure of the first locking seat and the second locking seat of the present invention.

Referring to FIG. 4, the driving assembly 50 comprises a driving member 510 having a driving lever 520 hingedly provided on the first locking seat 120, a driven lever 320 provided on the rotating member 310, a sliding groove 321 provided on the driven lever 320, and a linkage pin 530 movably inserted into the sliding groove 321 provided on the driving lever 520.

When unlocking is required, the driving member 510 is pivoted to rotate on a hinged axis of the driving lever 520, and during rotation, it drives the driving lever 520 to rotate the rotating member 310 by means of the linkage pin 530 to drive the moving member 210 to move relative to the first locking seat 120 by driving the driven helical tooth 312, further to disengage the conical locking sleeve 220 from the conical locking hole 122 and thereby separate the conical locking sleeve 220 from the first movable tube 130 to achieve unlocking.

Figure 3:
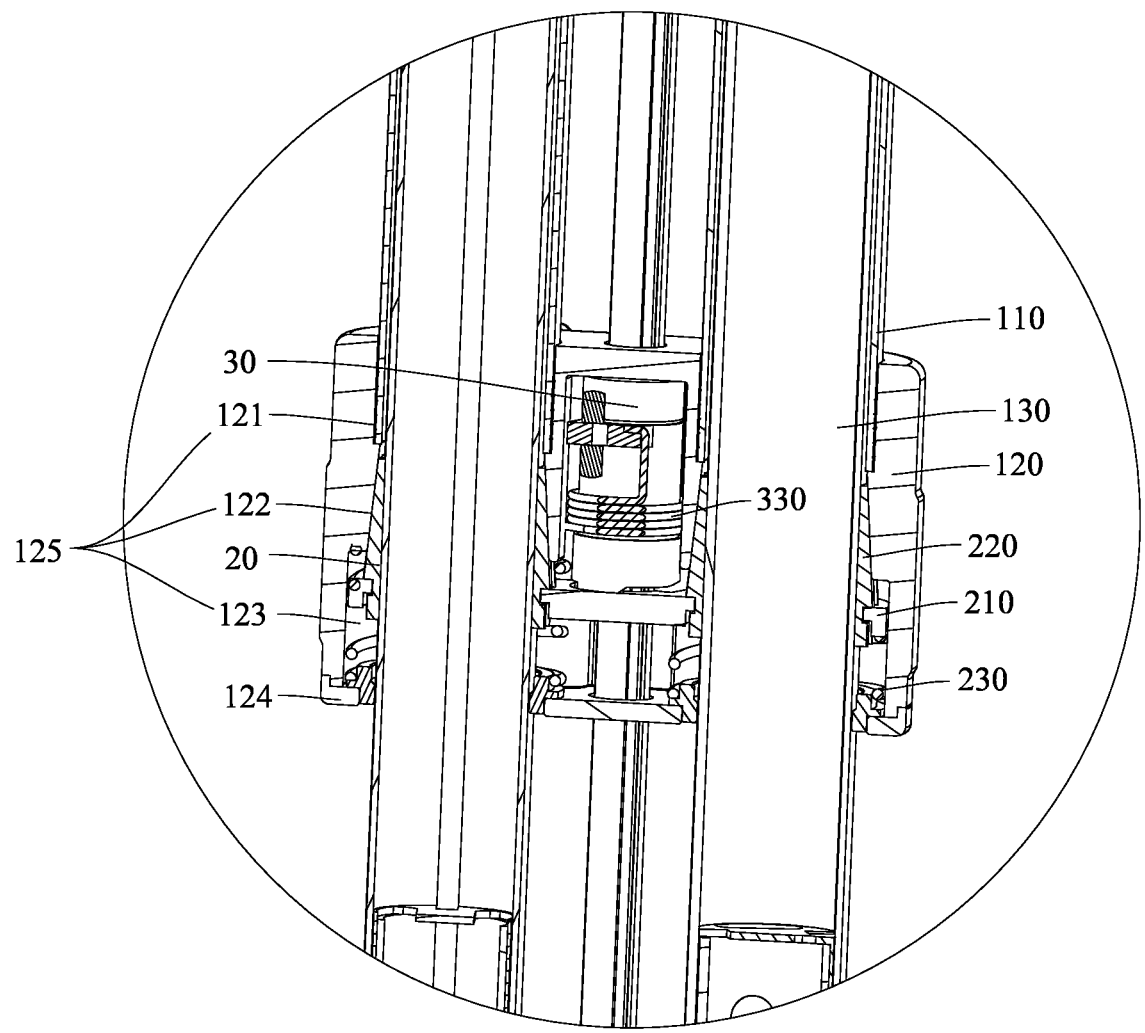
FIG. 3 is a schematic diagram of an enlarged structure at A in FIG. 2 of the present invention.
Figure 6:
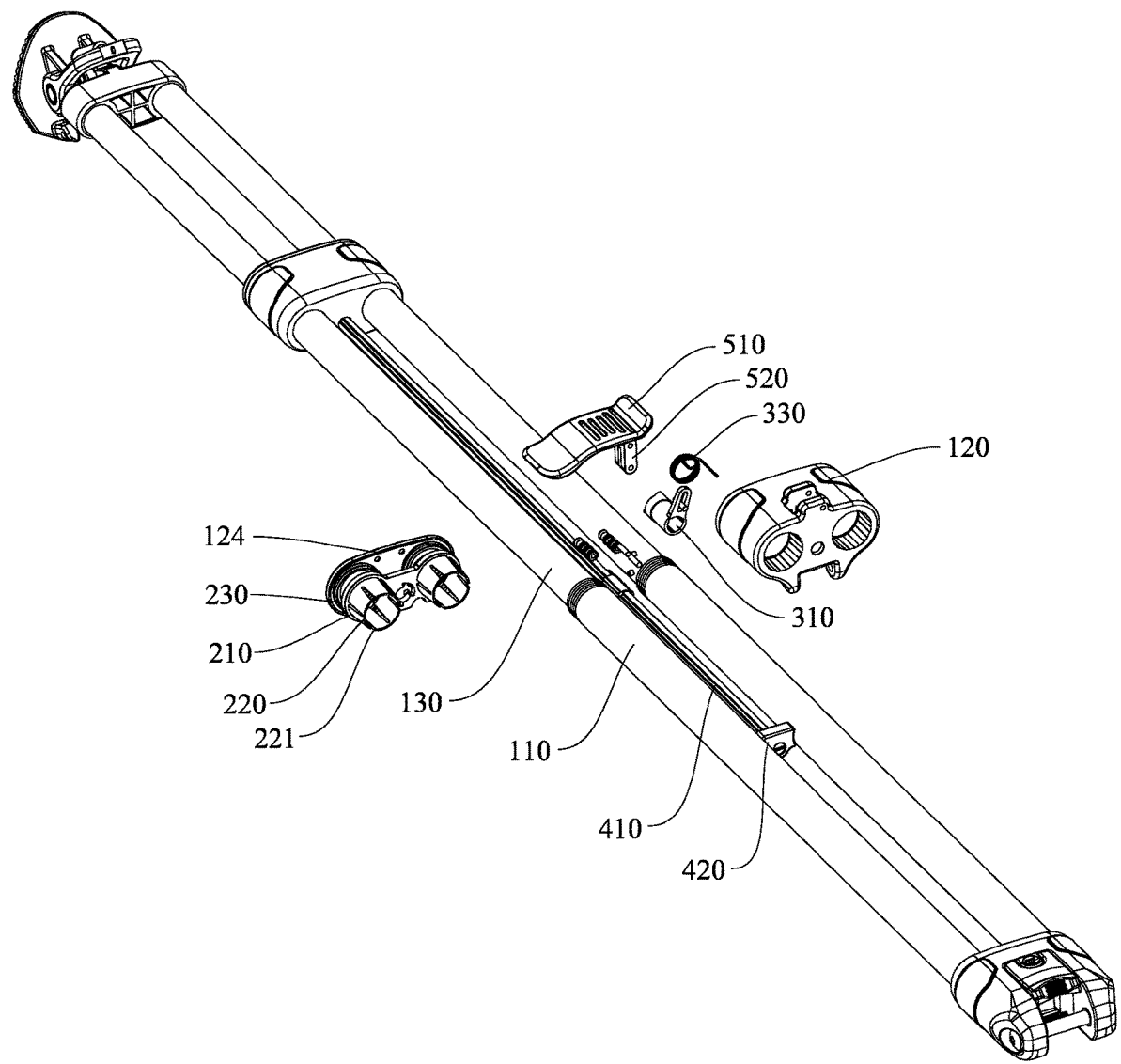
FIG. 6 is a schematic diagram of a leg decomposed structure of the present invention.
Figure 7:
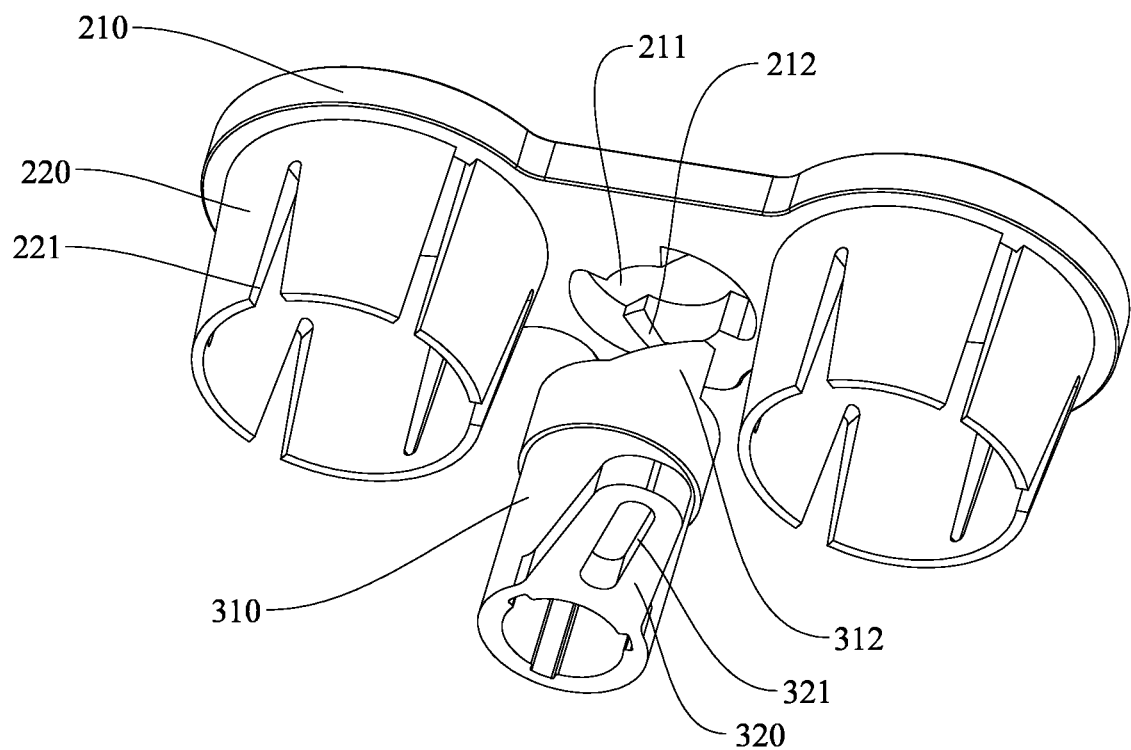
FIG. 7 is a first schematic diagram of a structure of the locking assembly and the transmission assembly of the present invention.
Figure 8:
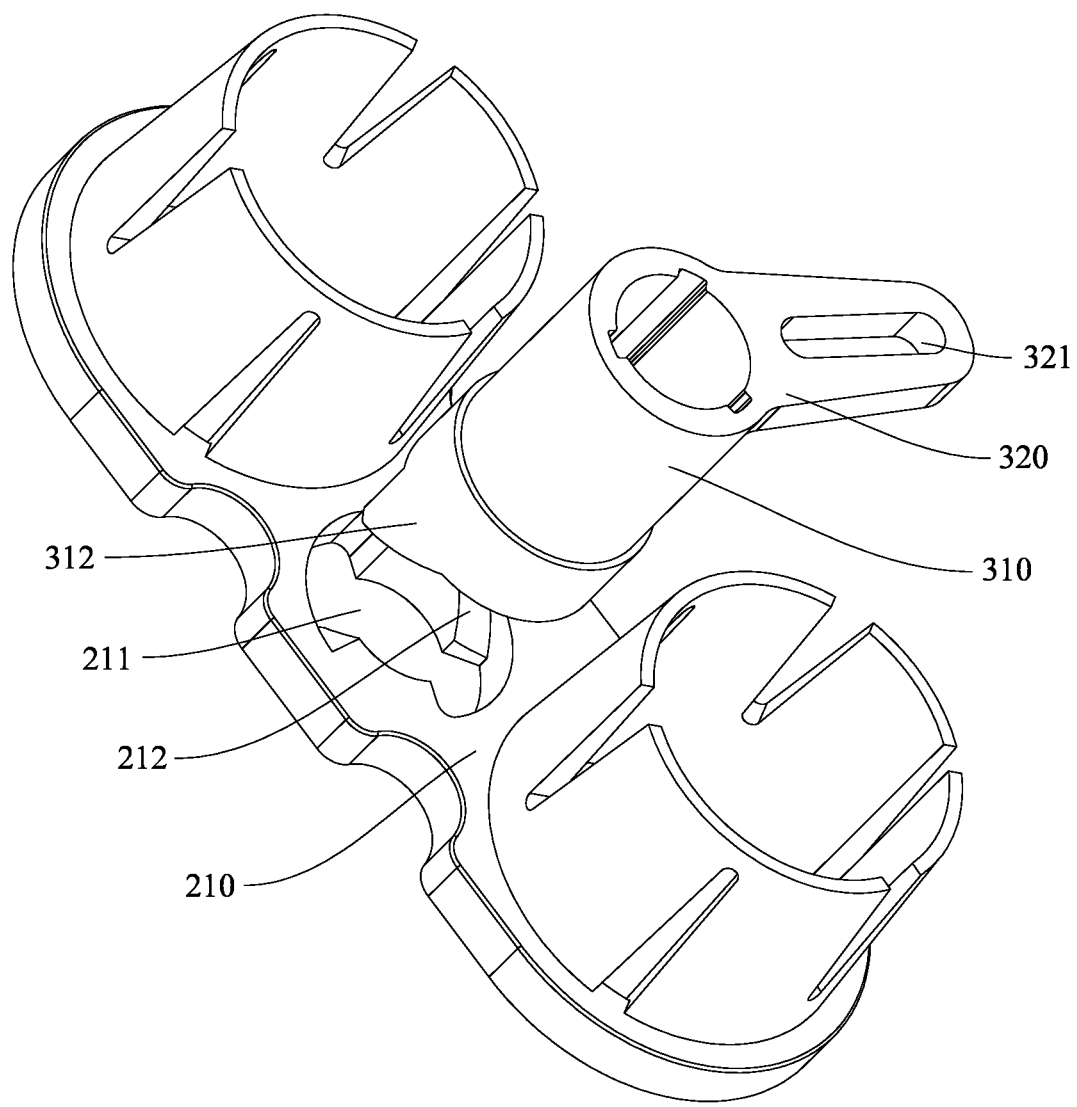
FIG. 8 is a second schematic diagram of a structure of the locking assembly and the transmission assembly of the present invention.
Figure 9:
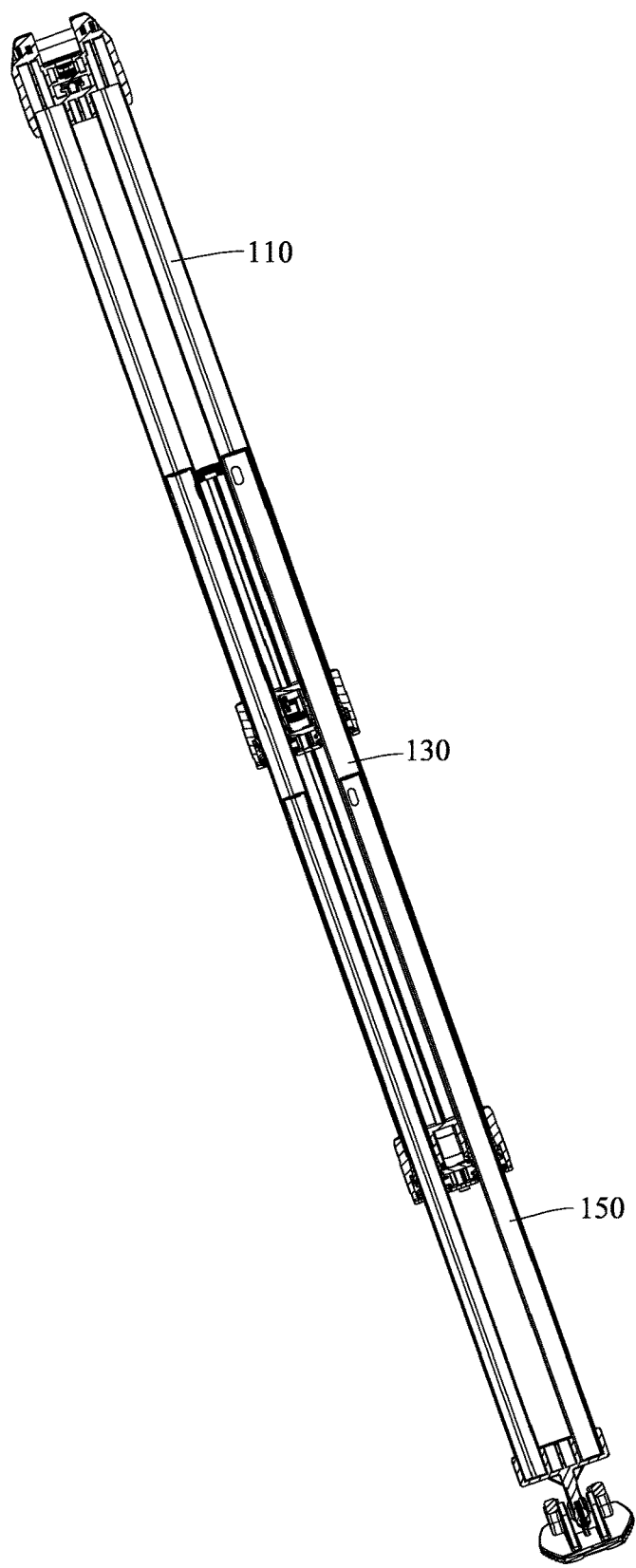
FIG. 9 is a third schematic diagram of a leg sectional structure of the present invention.

Referring to FIGS. 3 and 6, the rotating member 310 is sheathed on a torsion spring 330, one end of which is fixedly connected to the first locking seat 120, and the other end is fixed to the rotating member 310. The torsion spring 330 can apply a certain torque to the rotating member 310 to bring the rotating member 310 into a state of locking the tubes.

Referring to FIG. 3, an opening is provided at a rear end of the first locking seat 120 in communication with the first mounting chamber 125, a cover plate 124 is mounted at the rear end of the first locking seat 120, and the resilient member 230 is provided between the cover plate 124 and the moving member 210. The cover plate 124 may be assembled using an available detachable connection structure, such as a snap or screw connection.

Furthermore, referring to FIGS. 1 to 9, a second locking seat 140 is mounted on the rear end of the first movable tube 130, a second mounting chamber 141 is provided in the second locking seat 140, a second movable tube 150 capable of moving forward and backward with respect to the first movable tube 130 is slid within the first movable tube 130, and a rear end of the second movable tube 150 extends through the second mounting chamber 141 to the rear side. The locking assembly 20 is provided in the second mounting chamber 141 for sleeving on the second movable tube 150 and locked with the second locking seat 140, and the second locking seat 140 is equipped with the transmission assembly 30 for driving the locking assembly 20 to be unlocked or locked; the transmission assembly 30 in the first locking seat 120 is interconnected with the transmission assembly 30 in the second locking seat 140 by a linkage assembly 40.

Specifically, the structure of the second locking seat 140 is consistent with the structure of the first locking seat 120, the shape of the second mounting chamber 141 is consistent with the shape of the first mounting chamber 125, while the structures of the locking assembly 20 and the transmission assembly 30 mounted within the second locking seat 140 are consistent with those within the first locking seat 120.

In this embodiment, the first movable tube 130 is slid within the fixed tube 110, and the second movable tube 150 is slid within the first movable tube 130 to achieve a three-segment telescopic adjustment, and its structure has a more compact size and ensures the stability of the support compared to the existing abreast tubes.

The linkage assembly 40 is provided to achieve that when the locking assembly 20 within the first locking seat 120 is unlocked, the locking assembly 20 within the second locking seat 140 will also be unlocked synchronously to ensure that the first movable tube 130 will be locked or unlocked synchronously with the second movable tube 150.

Figure 2:
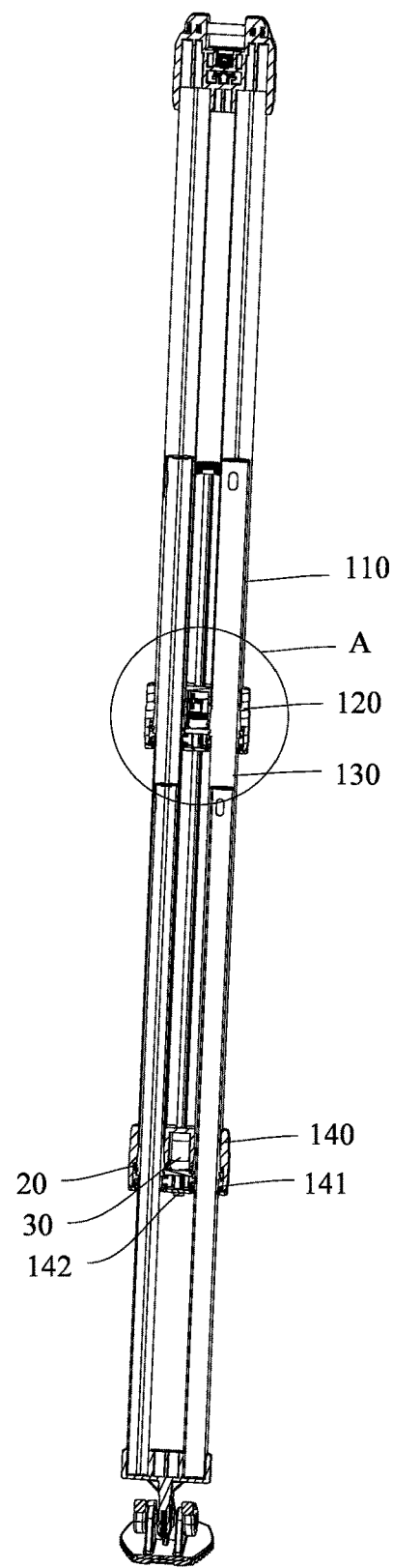
FIG. 2 is a first schematic diagram of a leg sectional structure of the present invention.

Furthermore, referring to FIGS. 1 and 2, the linkage assembly 40 comprises a linkage lever 410, the rotating members 310 in the two transmission assemblies 30 are cylindrical, the linkage lever 410 is inserted into the rotating members 310 in the two transmission assemblies 30, the linkage lever 410 is provided to move forward and backward with the front and rear rotating members 310, respectively, and a front end of the linkage lever 410 is provided with a first limiting member 430, while a second limiting member 142 is provided at a rear end of the linkage lever 410.

The first limiting member 430 and the second limiting member 142 serve to be able to prevent the linkage lever 410 from disengaging from the rotating member 310.

Referring to FIG. 4, the rotating member 310 is provided with a driven member 420, an inner wall of the rotating member 310 is provided with a first positioning groove 311, and an outer wall of the linkage lever 410 is provided with a second positioning groove 411; the driven member 420 is provided with a positioning block 421 which is inserted into the first positioning groove 311 and the second positioning groove 411, wherein the positioning block 421 inserted into the first positioning groove 311 and the second positioning groove 411, respectively, can achieve a linked integration of the rotating member 310, the driven member 420, and the linkage lever 410, which will drive the driven member 410 and the rotating member 310 to rotate when the linkage lever 410 rotates.

Furthermore, a first through hole 211 is provided on the moving member 210, and the linkage lever 410 is arranged to extend through the first through hole 211.

Furthermore, the driven helical tooth 212 is provided in the first through hole 211.

Specifically, both the first locking seat 120 and the second locking seat 140 are provided with a second through hole 126 for the linkage lever 410 to pass through.

The second limiting member 142 is a bolt, the bolt being threaded from the outside to the back and the inside of the second locking seat 140 with the rear end of the linkage lever 410.

Referring to FIG. 1, the second movable tube 150 is mounted with a supporting seat 160 at the rear end, and a supporting foot 170 is mounted on the supporting seat 160.

Figure 10:
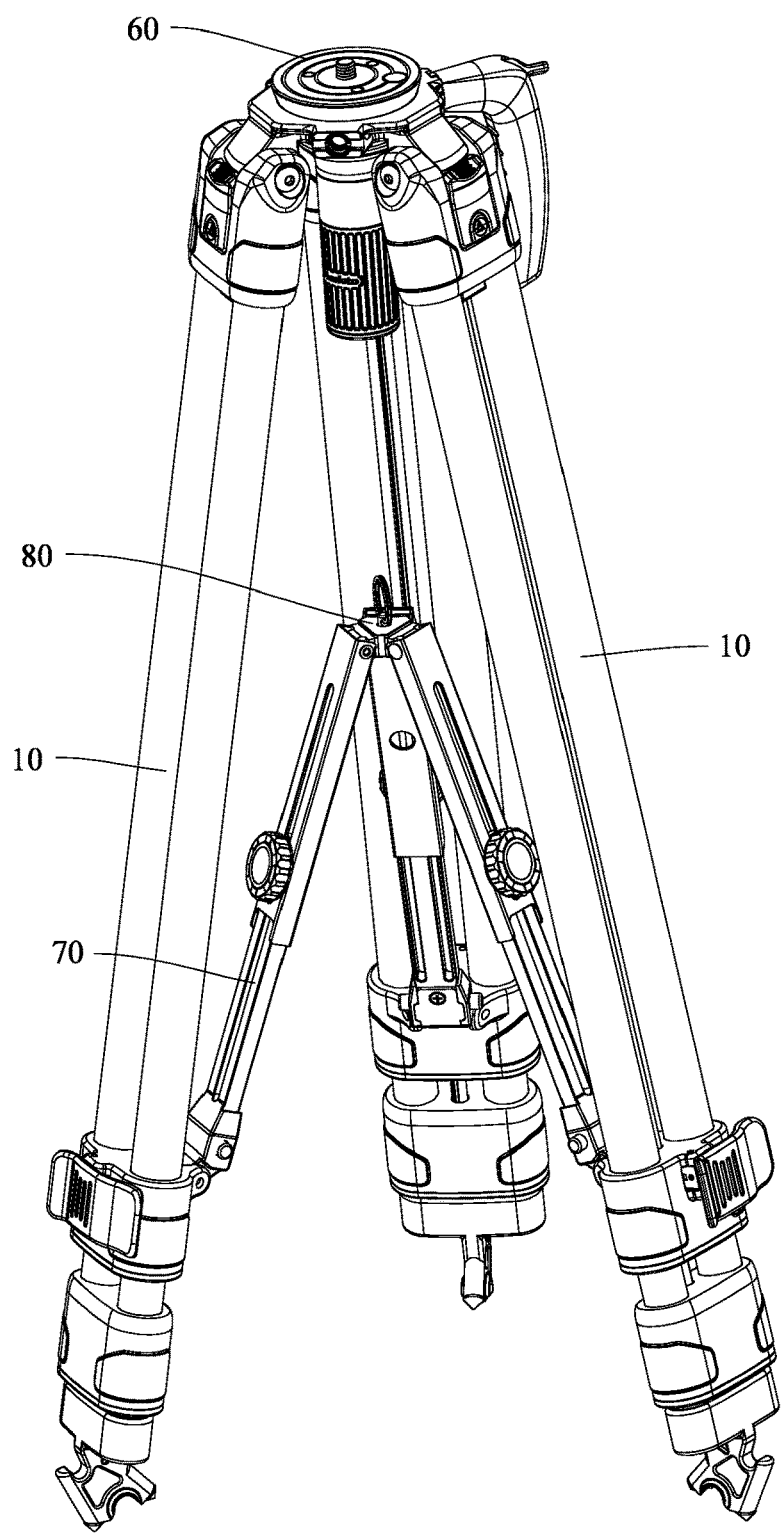
FIG. 10 is a schematic diagram of a three-dimensional structure of the photographic support.

Referring to FIG. 10, a stabilizing seat 80 is provided among the legs 10, the stabilizing seat 80 being hingedly connected to the one end of a telescoping tube 70, the other end of the telescoping tube 70 being hingedly connected to the first locking seat 120.

Content not described in detail in this specification is prior art known to those skilled in the art.

In the description of the present invention, it should be understood that the terms "center", "longitudinal", "lateral", "length", "width", "thickness", "up", "down", "front", "back", "left", "right", "vertical", "horizontal", "top", "bottom", "inside", "outside," "clockwise," "counterclockwise," and the like indicate orientation or positional relationships based on those shown in the accompanying drawings solely to facilitate and simplify the description of the present invention, It is not intended to indicate or imply that the device or element referred to must have a particular orientation, be constructed and operated in a particular orientation, and therefore cannot be construed as a limitation of the present invention, and the terms "first" and "second" are used for descriptive purposes only and are not to be construed as indicating or implying relative importance or implicitly indicating the number of technical features indicated.

The foregoing illustrates and describes the basic principles, principal features, and advantages of the present invention. Those skilled in the art should understand that the present invention is not limited by the foregoing embodiments that the foregoing embodiments and the description in the specification are merely illustrative of the principles of the present invention and that there will be various variations and improvements of the present invention without departing from the spirit and scope of the present invention which fall within the scope of the present invention claimed to be protected. The scope of the protection claimed for the present invention is defined by the appended claims and their equivalents.

What is claimed is:

1. A photographic support with rapid height adjustment mechanism, comprising a connection head (60) connected with multiple legs (10), the leg (10) consisting of a connection seat (100) on which a fixed tube (110) is fixedly mounted, characterized in that: a first locking seat (120) is fixedly mounted on a rear end of the fixed tube (110), a first mounting chamber (125) is provided in the first locking seat (120), a first movable tube (130) which can be moved forward and backward relative to the fixed tube (110) is slid within the fixed tube (110), and a rear end of the first movable tube (130) extends through the first mounting chamber (125) to the rear side; a locking assembly (20) is provided in the first mounting chamber (125) for sleeving on the first movable tube (130) and locked with the first locking seat (120); a transmission assembly (30) is mounted on the first locking seat (120) to drive the locking assembly (20) to be unlocked or locked, and a driving assembly (50) is also provided on the first locking seat (120) to drive the transmission assembly (30) for operation.

2. The photographic support with rapid height adjustment mechanism according to claim 1, wherein the first mounting chamber (125) comprises a connection hole (121), a conical locking hole (122), and a guided groove (123) in sequence from back to front, and wherein the rear end of the fixed tube (110) is fixedly connected to the connection hole (121), and the locking assembly (20) comprises a moving member (210) which is moved forward and backward within the guided groove (123), wherein the moving member (210) is provided with a conical locking sleeve (220) which can be sleeved on the first movable tube (130) and inserted into the conical locking hole (122) to achieve the clamping and locking operation of the first movable tube (130); the conical locking sleeve (220) is provided with multiple deformation slots (221), and the transmission assembly (30) is used to drive the moving member (210) to move forward and backward with respect to the guided groove (123).

3. The photographic support with rapid height adjustment mechanism according to claim 2, wherein the transmission assembly (30) comprises a rotating member (310) rotatably disposed within the first mounting chamber (125), the rotating member (310) being provided with a driving helical tooth (312) at one end near the moving member (210) which is provided with a driven helical tooth (212) intermeshed with the driving helical tooth (312); the driving assembly (50) is provided for driving the moving member (210) to be rotatably disposed relative to the first mounting chamber (125) which is provided with a resilient member (230) for applying a thrust force to the moving member (210) to maintain the conical locking sleeve (220) inserted in the conical locking hole (122).

4. The photographic support with rapid height adjustment mechanism according to claim 3, wherein the driving assembly (50) comprises a driving member (510) having a driving lever (520) hingedly provided on the first locking seat (120), a driven lever (320) provided on the rotating member (310), a sliding groove (321) provided on the driven lever (320), and a linkage pin (530) movably inserted into the sliding groove (321) provided on the driving lever (520).

5. The photographic support with rapid height adjustment mechanism according to claim 3, wherein the rotating member (310) is sheathed on a torsion spring (330), one end of which is fixedly connected to the first locking seat (120) and the other end is fixed to the rotating member (310).

6. The photographic support with rapid height adjustment mechanism according to claim 3, wherein an opening is provided at a rear end of the first locking seat (120) in communication with the first mounting chamber (125), a cover plate (124) is mounted at the rear end of the first locking seat (120), and the resilient member (230) is provided between the cover plate (124) and the moving member (210).

7. The photographic support with rapid height adjustment mechanism according to claim 3, wherein a second locking seat (140) is mounted on the rear end of the first movable tube (130), a second mounting chamber (141) is provided in the second locking seat (140), a second movable tube (150) capable of moving forward and backward with respect to the first movable tube (130) is slid within the first movable tube (130), and a rear end of the second movable tube (150) extends through the second mounting chamber (141) to the rear side, and the locking assembly (20) is provided in the second mounting chamber (141) for sleeving on the second movable tube (150) and locked with the second locking seat (140), which is equipped with the transmission assembly (30) for driving the locking assembly (20) to be unlocked or locked; the transmission assembly (30) in the first locking seat (120) is interconnected with the transmission assembly (30) in the second locking seat (140) by a linkage assembly (40).

8. The photographic support with rapid height adjustment mechanism according to claim 7, wherein the linkage assembly (40) comprises a linkage lever (410), the rotating members (310) in the two transmission assemblies (30) are cylindrical, the linkage lever (410) is inserted into the rotating members (310) in the two transmission assemblies (30), the linkage lever (410) is provided to move forward and backward with the front and rear rotating members (310), respectively, and the front end of the linkage lever (410) is provided with a first limiting member (430), while a second limiting member (142) is provided at the rear end of the linkage lever (410).

9. The photographic support with rapid height adjustment mechanism according to claim 8, wherein the rotating member (310) is provided with a driven member (420), an inner wall of the rotating member (310) is provided with a first positioning groove (311), and an outer wall of the linkage lever (410) is provided with a second positioning groove (411), the driven member (420) is provided with a positioning block (421) which is inserted into the first positioning groove (311) and the second positioning groove (411);

the second limiting member (142) is a bolt, the bolt being threaded, from the outside to the back and the inside of the second locking seat (140), with the rear end of the linkage lever (410).

10. The photographic support with rapid height adjustment mechanism according to claim 7, wherein a stabilizing seat (80) is provided among the legs (10), the stabilizing seat (80) being hingedly connected to the one end of a telescoping tube (70), the other end of the telescoping tube (70) being hingedly connected to the first locking seat (120).

* * * * *

UNITED STATES PATENT AND TRADEMARK OFFICE
CERTIFICATE OF CORRECTION

| | | |
|---|---|---|
| PATENT NO. | : 12,346,011 B2 | Page 1 of 1 |
| APPLICATION NO. | : 18/462281 | |
| DATED | : July 1, 2025 | |
| INVENTOR(S) | : Tongling Deng | |

It is certified that error appears in the above-identified patent and that said Letters Patent is hereby corrected as shown below:

On the Title Page

Please add the following section between items (65) and (51):
(30) Foreign Application Priority Data
Aug. 17, 2023 (CN) ................. 202311043919.4

Signed and Sealed this
Twelfth Day of August, 2025

Coke Morgan Stewart
*Acting Director of the United States Patent and Trademark Office*